(12) United States Patent
Nomura

(10) Patent No.: US 7,021,280 B2
(45) Date of Patent: Apr. 4, 2006

(54) IN-CYLINDER FUEL INJECTION INTERNAL-COMBUSTION ENGINE

(75) Inventor: Hiroshi Nomura, Gotenba (JP)

(73) Assignee: Toyota Jidoshi Kabushiki Kaisha, Toyota (JP)

( * ) Notice: Subject to any disclaimer, the term of this patent is extended or adjusted under 35 U.S.C. 154(b) by 0 days.

(21) Appl. No.: 11/023,358

(22) Filed: Dec. 29, 2004

(65) Prior Publication Data

US 2005/0150478 A1    Jul. 14, 2005

(30) Foreign Application Priority Data

Jan. 14, 2004    (JP)    ............... 2004-006501

(51) Int. Cl.
*F02B 5/00*    (2006.01)

(52) U.S. Cl. .................................. 123/305

(58) Field of Classification Search ............. 123/294, 123/298, 299, 305
See application file for complete search history.

(56) References Cited

U.S. PATENT DOCUMENTS

| 2003/0127069 A1* | 7/2003 | Hiraya et al. ............. 123/276 |
| 2004/0060538 A1* | 4/2004 | Togashi et al. ............ 123/294 |
| 2005/0081820 A1* | 4/2005 | Tanaka et al. ............. 123/295 |

FOREIGN PATENT DOCUMENTS

| JP | B2 2650298 | 5/1997 |
| JP | A 2000-220460 | 8/2000 |

* cited by examiner

*Primary Examiner*—John T. Kwon
(74) *Attorney, Agent, or Firm*—Oliff & Berridge, PLC

(57) ABSTRACT

A fuel injection valve that directly injects a fuel into a combustion chamber from a rim of a cylinder toward a center line of the cylinder in a slanting direction toward a lower portion of the combustion chamber, an ignition plug that is arranged at substantially a center of the cylinder, and injection openings from which a spray that forms a shape that widens toward an end from a portion near a center of the combustion chamber toward a side wall of the combustion chamber on a cross-section perpendicular to a direction of injection is injected are included.

11 Claims, 5 Drawing Sheets

IN-CYLINDER FUEL INJECTION INTERNAL-COMBUSTION ENGINE

BACKGROUND OF THE INVENTION

1) Field of the Invention

The present invention relates to an in-cylinder fuel injection internal-combustion engine that includes a fuel injection valve that directly injects a fuel into a combustion chamber.

2) Description of the Related Art

Generally, stratified combustion or homogeneous combustion is employed in in-cylinder fuel injection internal-combustion engines.

In the stratified combustion, fuel is injected into a combustion chamber during a compression process, and an air-fuel mixture of high concentration of the fuel is unevenly distributed near an ignition plug (6). Thus, in the stratified combustion, combustion can be caused even with an air-fuel mixture that has a lower concentration of the fuel than a concentration of the fuel based on a theoretical air-fuel ratio for a whole volume of the combustion chamber. On the other hand, in the homogeneous combustion, fuel is injected into the combustion chamber during an air intake process, and the combustion is caused by making the air-fuel mixture inside the combustion chamber homogeneous.

The stratified combustion is employed when higher fuel efficiency is required. On the contrary, the homogeneous combustion is employed when higher output is required. Moreover, because the stratified combustion enables to raise a temperature of a catalyst to an activation temperature at an early stage by heating up emissions, if the stratified combustion is applied at a cold start when an engine is just started, it is also possible to improve cleaning effect of the catalyst for the emission.

Conventionally, in the in-cylinder fuel injection internal-combustion engine, two combustion modes are selectively used for the compression process and the air intake process. Therefore, a fuel injection valve or that like that can appropriately change a form of a spray of the fuel depending on the combustion mode is provided in the in-cylinder fuel injection internal-combustion engine.

A conventional fuel injection valve is disclosed in, for example, Japanese Patent Application Laid-Open No. 2000-220460. The conventional fuel injection valve includes a plurality of injection openings that are arranged at a tip of a nozzle, a plurality of fuel flow paths that continue to the injection opening, and a switching unit corresponding to each of the fuel flow paths. In the conventional fuel injection valve, the fuel injection opening from which the fuel is sprayed is chosen by switching the fuel flow path by controlling the switching unit with a control unit.

Specifically, to cause the stratified combustion, the fuel is vertically sprayed in a form of a wide-angel spray from one centrally-located fuel injection opening during the compression process. As a result, the air-fuel mixture with high concentration of the fuel is distributed near the ignition plug using a tumble stream. On the other hand, to cause the homogeneous combustion, the fuel is sprayed in the form of the wide-angle spray from two injection openings arranged on both sides of the centrally-located injection opening (or the injection opening at the center and one injection opening adjacent to the injection opening at the center) during the air intake process. As a result, the fuel is spread in the entire combustion chamber.

Thus, in the conventional technology, optimal combustion according to a state of operation is realized by using a different form of the spray for each of the compression process and the air intake process.

A related technology is disclosed in Japanese Patent No. 2650298.

However, the conventional fuel injection valve requires provision of more than one of the injection opening, more than one of the fuel flow path, the switching unit, and the control unit to control the switching unit in a body. As a result, the overall structure and functioning of the fuel injection valve becomes complicated. As a result, there are higher chances that a malfunction takes place; moreover, the manufacturing cost also increases.

SUMMARY OF THE INVENTION

It is an object of the present invention to provide a low-cost and simpler fuel injection valve.

An in-cylinder fuel injection internal-combustion engine according to an aspect of the present invention includes a combustion chamber with a cylinder; a fuel injection valve that directly injects a fuel toward a center line of the cylinder from a direction that makes an angle with the center line of the cylinder; and an ignition plug that is arranged substantially at a vertex of the cylinder. The fuel injection valve includes an injection opening that is arranged at a tip of the fuel injection valve, and from which a spray is injected in such a manner that the spray has a shape in substantially a V-shape that gradually widens toward an end in directions from a portion closer to the ignition plug to portions closer to a surface of a side wall of the combustion chamber, the shape formed on a cross-section perpendicular to a direction of injection.

In the in-cylinder fuel injection internal-combustion engine, a width of the shape is narrow at the portion closer to the ignition plug, and is wide at the portion closer to the surface of the side wall, and the injection opening has a shape that is substantially symmetrical with respect to a plane that includes a center axis of the fuel injection valve, and that is in substantially a V-shape that gradually widens toward an end on a cross-section perpendicular to a direction of the injection, and a width of the shape of the injection opening is narrow at the portion closer to the ignition plug, and is wide at the portion closer to the surface of the side wall.

In the in-cylinder fuel injection internal-combustion engine, a width of the shape is narrow at the portion closer to the ignition plug, and is wide at the portion closer to the surface of the side wall, and the injection opening has a shape that is substantially symmetrical with respect to a plane that includes a center axis of the fuel injection valve, and that is in substantially a wedge-shape that gradually narrows from an end on a cross-section perpendicular to a direction of the injection, and a width of the shape of the injection opening is narrow at the portion closer to the ignition plug, and is wide at the portion closer to the surface of the side wall.

In the in-cylinder fuel injection internal-combustion engine the fuel injection valve further includes an opening that is a slit, and that is formed at the tip of the fuel injection valve at a portion along a plane that includes a substantially center axis of the fuel injection valve, the portion in a space inside the shape of the injection opening.

In the in-cylinder fuel injection internal-combustion engine a length of the slit is substantially same as a length of one side of the injection opening.

In the in-cylinder fuel injection internal-combustion engine a length of the slit is shorter than a length of one side of the injection opening.

In the in-cylinder fuel injection internal-combustion engine the fuel injection valve further includes an opening that is substantially circular, and that is formed at the tip of the fuel injection valve at a portion on a plane that includes a substantially center axis of the fuel injection valve, the portion in a space inside the injection opening.

In the in-cylinder fuel injection internal-combustion engine the fuel injection valve further includes an opening that is substantially elliptic, and that is formed at the tip of the fuel injection valve at a portion on a plane that includes a substantially center axis of the fuel injection valve, the portion in a space inside the injection opening.

In the in-cylinder fuel injection internal-combustion engine the fuel injection valve further includes an opening that has a shape of a four sided figure, and that is formed at the tip of the fuel injection valve at a portion on a plane that includes a substantially center axis of the fuel injection valve, the portion in a space inside the injection opening.

In the in-cylinder fuel injection internal-combustion engine the fuel injection valve further includes an opening that is triangular, and that is formed at the tip of the fuel injection valve at a portion on a plane that includes a substantially center axis of the fuel injection valve, the portion in a space inside the injection opening.

In the in-cylinder fuel injection internal-combustion engine the opening is positioned at a narrower portion in the space inside the injection opening.

The other objects, features, and advantages of the present invention are specifically set forth in or will become apparent from the following detailed description of the invention when read in conjunction with the accompanying drawings.

DETAILED DESCRIPTION

Exemplary embodiments of an in-cylinder fuel injection internal-combustion engine according to the present invention will be explained in detail with the accompanying drawings. However, the present invention is not limited to the embodiments below.

Figure 1:
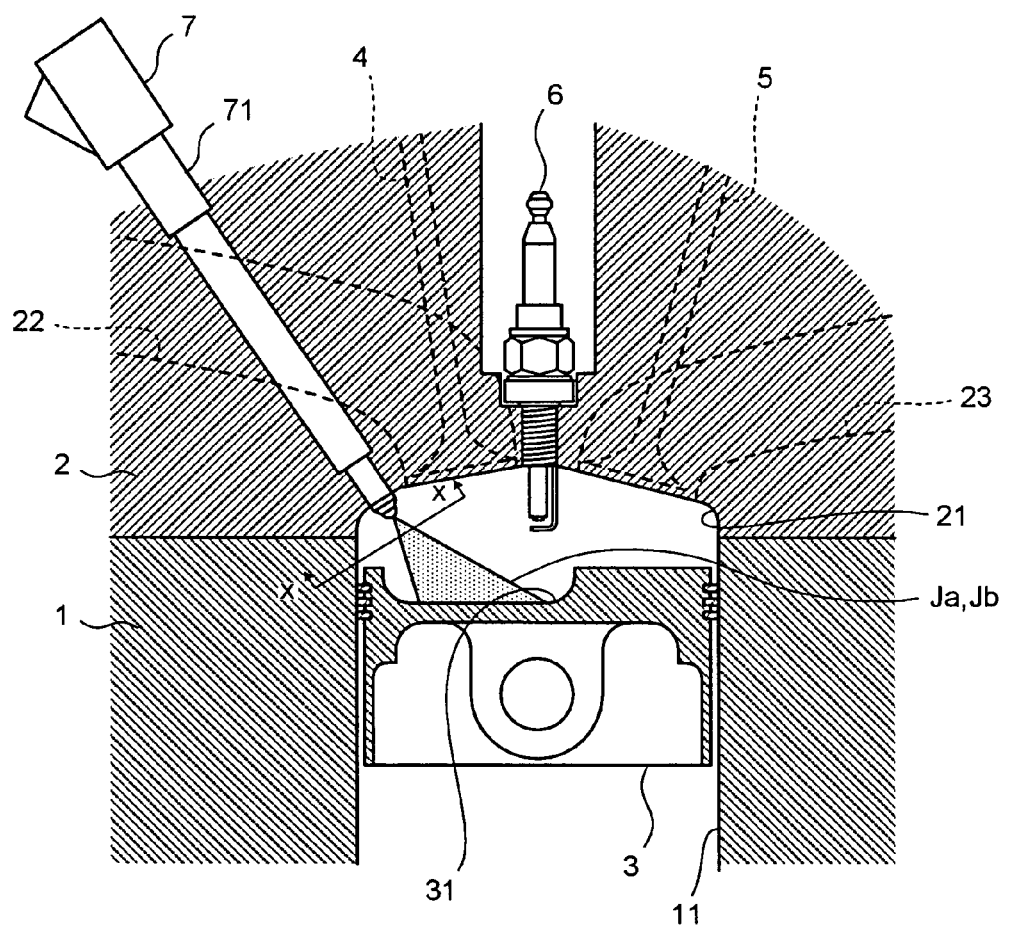
FIG. 1 is a cross-section of a combustion chamber of an in-cylinder fuel injection internal-combustion engine according to an embodiment of the present invention.

FIG. 1 is a cross-section of an in-cylinder fuel injection internal-combustion engine according to a first embodiment of the present invention. FIG. 1 specifically illustrates a combustion chamber and the structure around the combustion chamber. Although only one cylinder is shown in FIG. 1, the present invention can be applied to multi-cylinder internal-combustion engines in-line types or V-types.

The combustion chamber is a space that is formed with surfaces of a cylinder bore 11 of a cylinder block 1, a concave part 21 of a cylinder head 2, and a piston 3. Atop surface of the piston 3 has a dish-shaped, substantially elliptical cavity 31.

The cylinder head 2 includes two intake ports 22 (only one of the intake ports are shown in FIG. 1 for a conveniences' sake) and at least one exhaust port 23. The intake port 22 and the exhaust port 23 include an intake valve 4 and an exhaust valve 5 that open and shut openings therefor respectively.

The cylinder head 2 includes an arrangement for fitting an ignition plug 6 and a fuel injection valve 7. The ignition plug 6 is arranged substantially at a vertex of the concave part 21. The fuel injection valve 7 is arranged at a rim of the concave part 21 in such a manner that a tip of the fuel injection valve 7 points toward a center line of a cylinder in a slanting direction.

The fuel injection valve 7 includes a main body 71 (see FIG. 1), a nozzle 72 (see FIG. 2) that is hollow, a needle valve 73 (see FIG. 3) that is slidable, and a needle-valve sliding unit (not shown) that slides the needle valve 73 in a direction along an axis of the nozzle 72. The nozzle 72 includes two injection openings 72a and 72b at a tip in its hollow structure as shown in FIG. 3.

In the nozzle 72, the hollow structure forms a flow path 72A for the fuel. The nozzle 72 sprays the fuel from each of the injection openings 72a and 72b that are connected to the flow path 72A. The nozzle 72 is fixed to the tip of the main body 71 with, for example, by caulking. The nozzle 72 of which a tip is substantially conical is shown as an example.

The needle valve 73 is pressed with, for example, a spring to face toward the tip of the nozzle 72. In such as state of the needle valve 73 being pressed, the needle valve 73 stops the fuel to be sprayed from the injection openings 72a and 72b by either closing each of the injection openings 72a and 72b, or by shutting the flow path 72A. When injection of the fuel is necessary, the needle valve 73 is slid in such a manner that the needle valve 73 comes apart from the tip of the nozzle 72 by the needle-valve sliding unit in accordance with an instruction from a control unit (not shown), which is an electronic control unit (ECU). Thus, each of the injection openings 72a and 72b and the flow path 72A become in communication with each other, and the fuel can be sprayed out.

Each of the injection openings 72a and 72b is formed as a slit at the tip of the nozzle 72. As shown in FIG. 3, the injection openings 72a and 72b are formed to face in directions away from a plane (hereinafter, a "nozzle virtual plane") P1 that is parallel to a plane that includes a center axis of the nozzle 72. In other words, the injection openings 72a and 72b are formed such that the fuel sprayed forms a shape widening toward an end. The nozzle virtual plane P1 in the first embodiment includes the center axis of the nozzle 72.

By arranging the injection openings 72a and 72b as the slits described above, sprays Ja and Jb that are flat fan-shaped are injected in a direction of the injection in such a manner that the sprays Ja and Jb form the shape widening toward an end.

Figure 2:
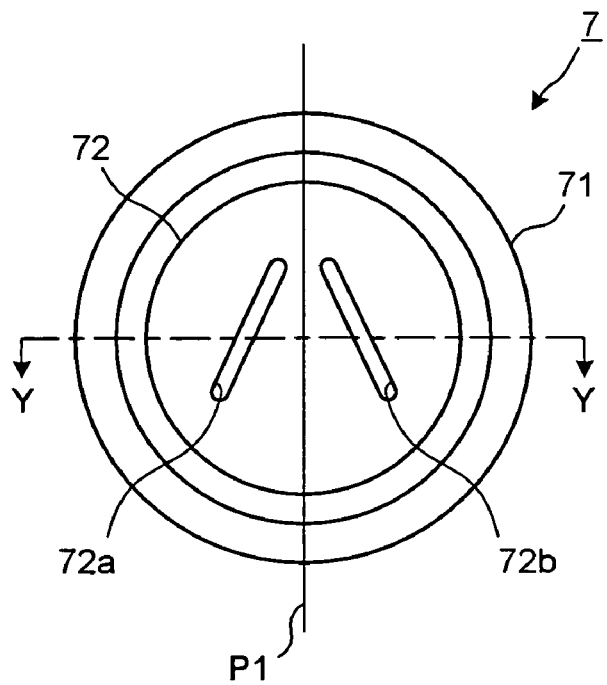
FIG. 2 is a schematic of an injection opening of an in-cylinder fuel injection internal-combustion engine according to a first embodiment of the present invention.
Figure 3:
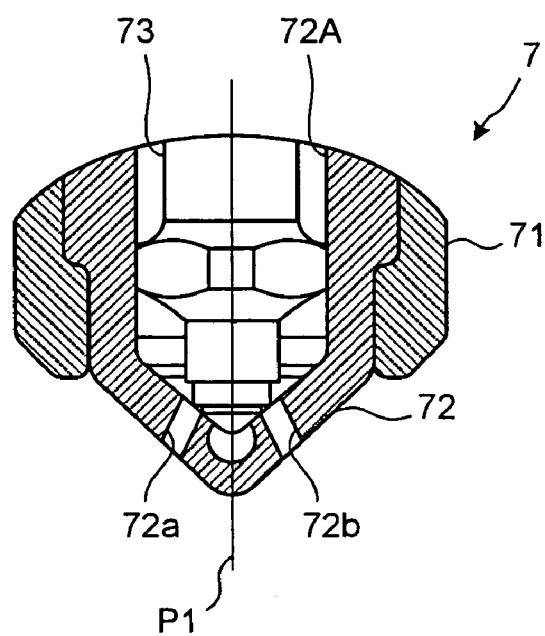
FIG. 3 is cross-section of a fuel injection valve according to the first embodiment taken along a line Y—Y shown in FIG. 2.
Figure 4:
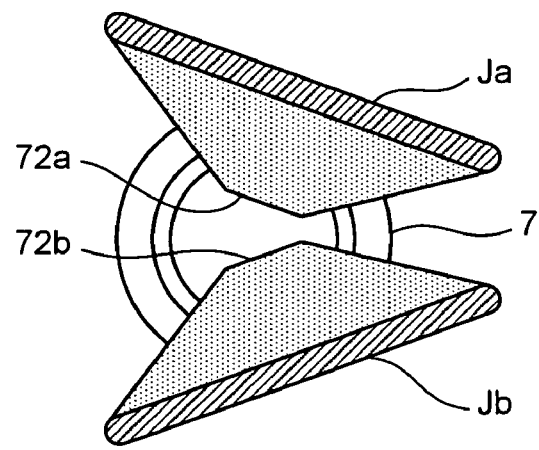
FIG. 4 is a schematic of a spray from the fuel injection valve shown in FIG. 3.

As shown in FIG. 2, the injection openings 72a and 72b are arranged in such a manner that the injection openings 72a and 72b are substantially symmetrical with respect to the nozzle virtual plane P1 when the nozzle 72 is seen from a side of the tip thereof, and a distance between an end of the injection opening 72a and an end of the injection opening 72b that are substantially symmetrical with respect to the nozzle virtual plane P1 is shorter than a distance between another end of the injection opening 72a and another end of the injection opening 72b that are substantially symmetrical with respect to the nozzle virtual plane P1. Thus, the sprays Ja and Jb of which cross-sections perpendicular to a direction of the injection have a shape that gradually widens toward an end as shown in FIG. 4.

The fuel injection valve 7 is arranged at the rim of the concave part 21 in the cylinder head 2 in such a manner that the tip of the fuel injection valve 7 points toward the center line of the cylinder and toward the lower portion of the combustion chamber in the slanting direction as previously described. Moreover, the fuel injection valve 7 is fixed in such a manner that the nozzle virtual plane P1, a plane (hereinafter, "piston virtual plane") P2 parallel to a plane that includes a center axis of the piston 3, and a plane (hereinafter, "ignition-plug virtual plane") P3 parallel to a plane that includes a center axis of the ignition plug 6 are on a same plane. Specifically, the fuel injection valve 7 is arranged in such a manner that the sprays Ja and Jb hit the cavity 31 of the piston 3 when the piston 3 is positioned near an upper dead point.

Furthermore, the fuel injection valve 7 is arranged in such a manner that the ends of the injection openings 72a and 72b of which the distance between each other is shorter point toward an upper portion (central portion) of the combustion chamber.

Therefore, the fuel injection valve 7 injects the sprays Ja and Jb that form, on the cross-section perpendicular to the direction of the injection, a shape of which a portion closer to the upper portion of the combustion chamber is narrow and a portion closer to the lower portion of the combustion chamber is wide.

During the cold-start, for example, when an engine is just started, a warm-up operation is usually performed. The control unit controls timing of injection of the fuel to inject the fuel at a late stage of the compression process, specifically when the piston 3 reaches near the upper dead point during the compression process.

When the piston 3 reaches near the upper dead point during the compression process, the needle-valve sliding unit slides the needle valve 73 to a direction away from the tip of the nozzle 72 in accordance with an instruction for an action from the control unit. Thus, the fuel injection valve 7 injects the sprays Ja and Jb.

Figure 5:
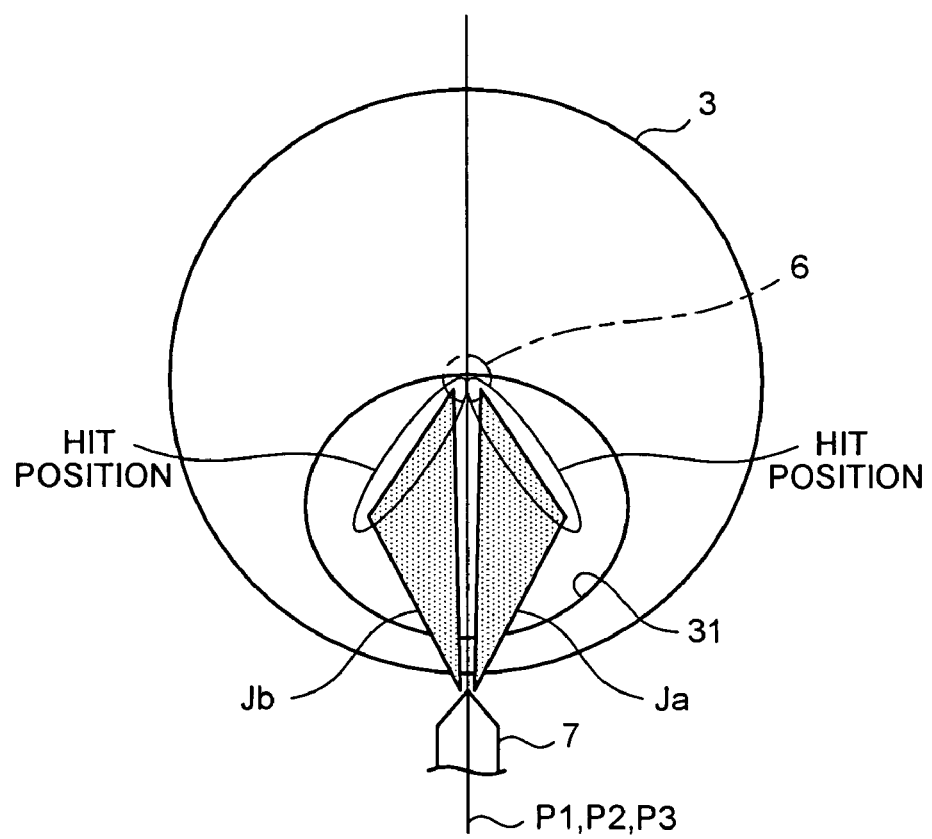
FIG. 5 is a schematic of the spray from the fuel injection valve seen from a side of a piston top surface.

As, shown in FIG. 5, the sprays Ja and Jb hit the cavity 31 of the piston 3 in a shape in which a distance between ends near a center of the piston 3 is shorter and a distance between ends near a rim of the piston 3 is longer. The air-fuel mixture with high concentration of the fuel that is formed at the cavity 31 is carried to a portion near the ignition plug 6 to cause the stratified combustion.

In the first embodiment, because the narrow portion of the sprays Ja and Jb hits around the center (around a portion of the cavity 31 below the ignition plug 6) of the piston 3, the air-fuel mixture with high concentration of the fuel is likely to be distributed near the ignition plug 6.

The control unit controls the timing of the injection of the fuel to inject the fuel during the air intake process, for example, when the power of the engine is to be increased. The fuel injection valve 7 of which the needle valve 73 is slid away from the tip of the nozzle 72 injects the sprays Ja and Jb having the form described above.

If the sprays Ja and Jb are injected when the piston 3 is positioned at a lower dead point, the sprays Ja and Jb spread in the combustion chamber as the sprays Ja and Jb travel toward the lower portion and toward a surface of a wall of the cylinder. Thus, the sprays Ja and Jb are distributed in the entire area of the combustion chamber. Thus, the fuel injection valve 7 causes the homogeneous combustion by spraying the fuel during the air intake process.

As described above, according to the first embodiment, the fuel injection valve 7 includes the injection openings 72a and 72b that form the shape described above, and that are arranged at the tip of the fuel injection valve 7. Moreover, the cylinder head 2 is arranged in such a manner that a narrow portion of the sprays Ja and Jb is positioned closer to the upper portion of the combustion chamber, and a wide portion of the sprays Ja and Jb is positioned closer to the lower portion of the combustion chamber. Thus, it is possible to concentrate the air-fuel mixture with high concentration of the fuel near the ignition plug 6 when the injection during the compression process is carried out, and to provide the air-fuel mixture in which the fuel is distributed to the whole area inside the combustion chamber when the injection during the air intake process is carried out.

In other words, without a complicated mechanism to vary the shape of the spray as in the conventional technology, it is possible to selectively cause the specified combustion and the homogeneous combustion by arranging a simple structure of the slits as the injection openings 72a and 72b that form a shape gradually widens toward the end in the fuel injection valve 7. Furthermore, because of the simple structure, it is possible to eliminate a possibility of occurrence of a trouble such as a malfunction, and to keep the manufacturing cost for the fuel injection valve from increasing.

While in the first embodiment, the injection openings 72a and 72b are formed substantially symmetrically with respect to the nozzle virtual plane P1 that includes the center axis of the nozzle 72, the injection openings 72a and 72b may be formed substantially symmetrically with respect to the nozzle virtual plane P1 that does not include the center axis but is parallel to the plane that includes the center axis. In this case, it is preferable that the fuel injection valve 7 and the ignition plug 6 are arranged in such a manner that at least the nozzle virtual plane P1 and the ignition-plug virtual plane P3 are substantially on a same plane.

Furthermore, while in the first embodiment, a case in which the injection openings 72a and 72b are arranged in the nozzle 72 of which the tip is conical is explained, the injection openings 72a and 72b may be arranged at, for example, a tip that is flat plane that is perpendicular to the center axis of the nozzle 72.

Moreover, in the first embodiment, a case in which two units of the injection openings 72a and 72b are arranged in such a manner that the distance between the end of the injection opening 72a and the end of the injection opening 72b that are substantially symmetrical with respect to the nozzle virtual plane P1 is shorter than a distance between the other end of the injection opening 72a and the other end of the injection opening 72b that are substantially symmetrical with respect to the nozzle virtual plane P1 has been explained. However, the injection opening may be a single unit of the injection opening that is formed in a V-shape, connecting the ends of the injection openings 72a and 72b having a shorter distance therebetween. With such injection opening in the V-shape, it is possible to obtain a same effect as that of the injection openings 72a and 72b formed in the fuel injection valve 7.

In other words, the injection opening is not limited as long as the injection opening forms a shape that widens toward an end from the upper portion of the combustion chamber to the lower portion of the combustion chamber when the fuel injection valve is fixed to the cylinder head 2. Therefore, at least one unit of the injection opening that forms such shape that widens toward the end should be formed at the tip of the nozzle 72. From such injection opening, the spray of which a cross-section perpendicular to the direction of the injection gradually widens toward an end from a portion near the center of the combustion chamber to a portion near the wall of the combustion chamber is injected.

An in-cylinder fuel injection internal-combustion engine according to a second embodiment of the present invention has a different shape of the injection opening in the fuel injection valve 7 from that of the first embodiment. Other parts are same as the first embodiment.

Figure 6:
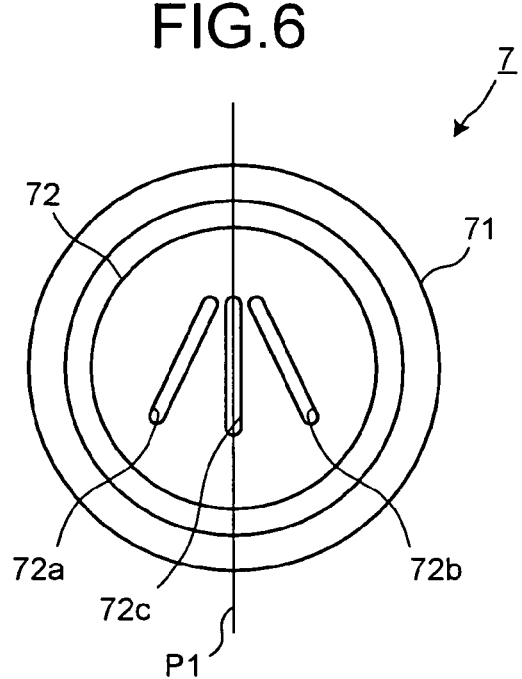
FIG. 6 is a schematic of an injection opening of an in-cylinder fuel injection internal-combustion engine according to a second embodiment of the present invention.

The fuel injection valve 7 according to the second embodiment includes an injection opening 72c that is formed in a slit in addition to the injection openings 72a and 72b that forms the shape widening toward the end similarly to the first embodiment. The injection opening 72c is arranged between the injection openings 72a and 72b at a point at which the nozzle virtual plane P1 and the tip of the nozzle 72 cross as shown in FIG. 6.

With the fuel injection valve 7 that includes three units of the injection openings 72a, 72b and 72c, it is possible to concentrate the air-fuel mixture with high concentration of the fuel near the ignition plug 6 when the injection during the compression process is carried out, further efficiently than a case in the first embodiment.

Figure 7:
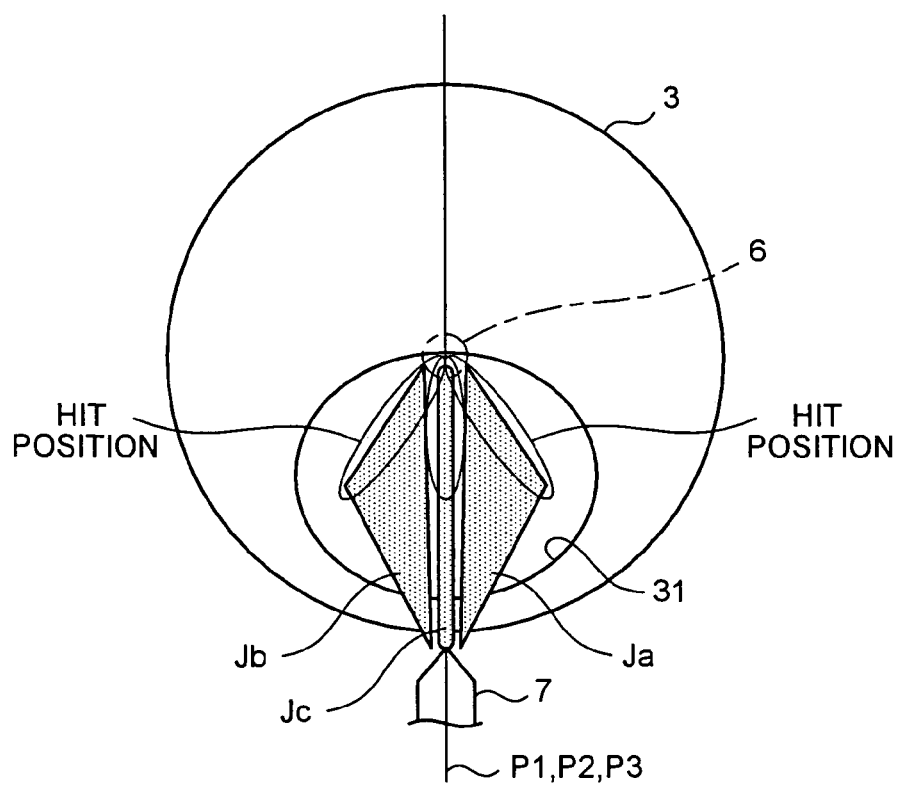
FIG. 7 is a schematic of a spray from a fuel injection valve according to the second embodiment seen from a side of a piston top surface.

The sprays Ja and Jb injected from the injection openings 72a and 72b enable to concentrate the air-fuel mixture with high concentration of the fuel near the ignition plug 6 during the compression process similarly to the first embodiment. Furthermore, in the second embodiment, the injection opening 72c enables to carry the air-fuel mixture in a spray Jc shown in FIG. 7 to a position even closer to the ignition plug 6. Therefore, it is possible to efficiently carry the air-fuel mixture with high concentration of the fuel near the ignition plug 6.

Moreover, for the injection during the air intake process, because the spray Jc is injected in addition to the sprays Ja and Jb toward the wall of the cylinder, it is possible to distribute the fuel to the whole area inside the combustion chamber further efficiently.

Thus, with the fuel injection valve 7 according to the second embodiment, it is possible to selectively cause the stratified combustion and the homogeneous combustion with a simple structure similarly to the first embodiment. Furthermore, because of the simple structure, it is possible to decrease a possibility of the trouble such as the malfunction, and to keep the manufacturing cost for the fuel injection valve from increasing.

A length of the injection opening 72c may be same as a length of the injection openings 72a and 72b as shown in FIG. 6. If efficiency in distribution of the air-fuel mixture in the injection during the compression process is considered, the injection opening 72c may be formed as a slit starting from a portion between the ends of the injection openings 72a and 72b of which the distance therebetween is shorter to a portion at substantially the center of the nozzle 72.

An in-cylinder fuel injection internal-combustion engine according to a third embodiment of the present invention has a different shape of the injection opening in the fuel injection valve 7 from that of the first embodiment. Other parts are same as the first embodiment.

Figure 8:
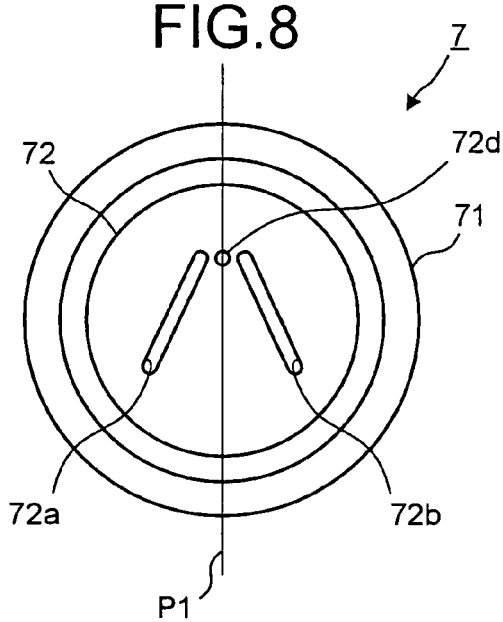
FIG. 8 is a schematic of an injection opening of an in-cylinder fuel injection internal-combustion engine according to a third embodiment of the present invention.

The fuel injection valve 7 according to the third embodiment includes an injection opening 72d that is substantially circular in addition to the injection openings 72a and 72b. The injection opening 72d is arranged between the injection openings 72a and 72b at the point at which the nozzle virtual plane P1 and the tip of the nozzle 72 cross as shown in FIG. 8.

The injection opening 72d is formed near the portion between the ends of the injection openings 72a and 72b of which the distance therebetween is shorter. While in FIG. 8, the injection opening 72d that is substantially circular is shown, the injection opening 72d is not limited to this shape. The injection opening 72d may have other shapes such as an ellipse, a polygon, and a triangle.

Figure 9:
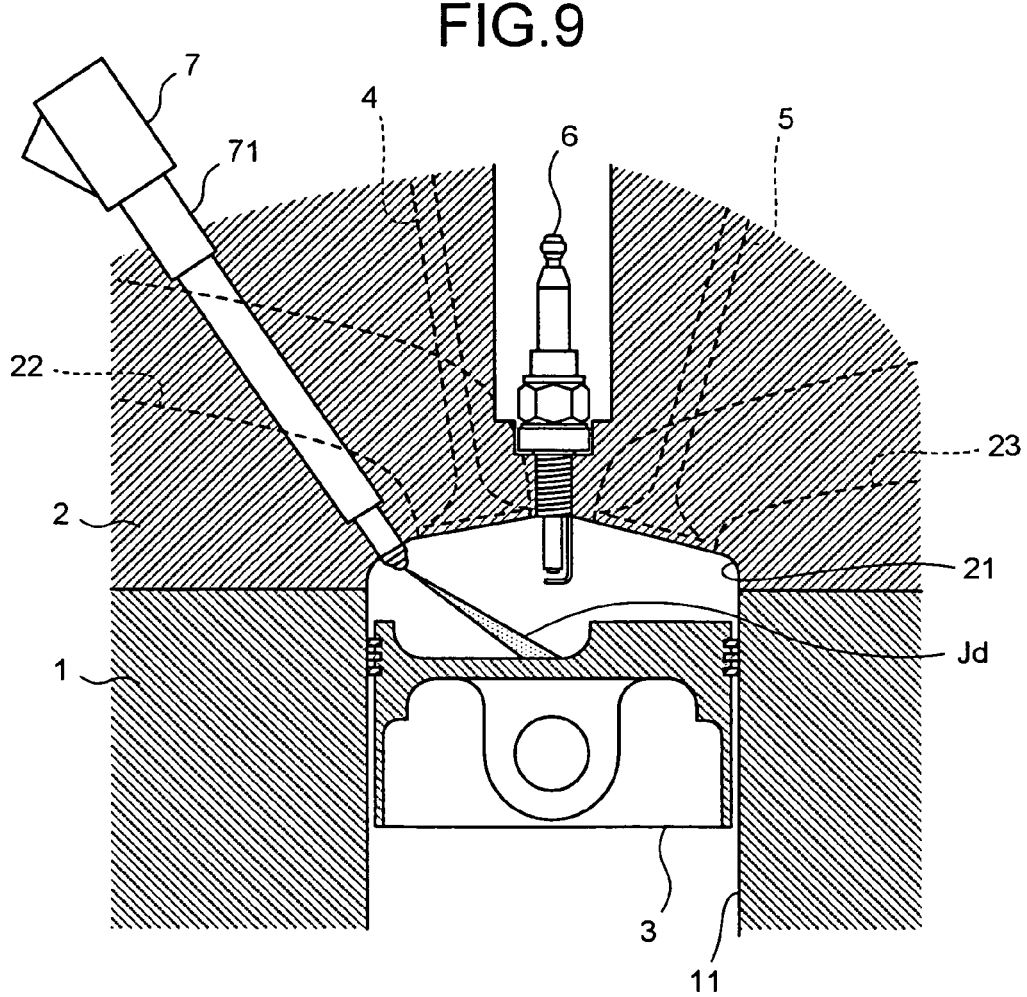
FIG. 9 is a schematic of a spray from a fuel injection valve according to the third embodiment seen from a side of the in-cylinder fuel injection internal-combustion engine.

With the fuel injection valve 7 that includes three units of the injection openings 72a, 72b and 72d, a spray Jd is injected locally from the injection opening 72d shown in FIG. 9 in addition to the sprays Ja and Jb when the injection during the compression process is performed. Therefore, it is possible to carry the air-fuel mixture formed with the spray Jd closer to the ignition plug 6. Thus, an effect same as that obtained in the second embodiment can be obtained also in the third embodiment. In FIG. 9, the sprays Ja-and Jb are omitted for a convenience' sake.

Moreover, in the injection during the air intake process, it is possible to obtain the same effect as the first embodiment with the sprays Ja and Jb from the injection openings 72a and 72b.

Thus, with the fuel injection valve 7 according to the third embodiment, it is possible to selectively cause the stratified combustion and the homogeneous combustion with a simple structure similarly to the first embodiment and the second embodiment. Furthermore, because of the simple structure, it is possible to decrease the possibility of the trouble such as the malfunction, and to keep the manufacturing cost for the fuel injection valve from increasing.

According to the present invention, it is possible to perform spraying suitable for each of combustion during the compression process and combustion during the air intake process with a simple structure. Moreover, it is possible to improve reliability of the fuel injection valve and the in-cylinder fuel injection internal-combustion engine, and to keep the manufacturing cost from increasing.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An in-cylinder fuel injection internal-combustion engine comprising:
   a combustion chamber with a cylinder;
   a fuel injection valve that directly injects a fuel toward a center line of the cylinder from a direction that makes an angle with the center line of the cylinder; and an ignition plug that is arranged substantially at a vertex of the cylinder, wherein the fuel injection valve includes an injection opening that is arranged at a tip of the fuel injection valve, and from which a spray is injected in such a manner that the spray has a shape in substantially a V-shape that gradually widens toward an end in directions from a portion closer to the ignition plug to portions closer to a surface of a side wall of the combustion chamber, the shape formed on a cross-section perpendicular to a direction of injection.

2. The in-cylinder fuel injection internal-combustion engine according to claim 1, wherein a width of the shape is narrow at the portion closer to the ignition plug, and is wide at the portion closer to the surface of the side wall, and the injection opening has a shape that is substantially symmetrical with respect to a plane that includes a center axis of the fuel injection valve, and that is in substantially a V-shape that gradually widens toward an end on a cross-section perpendicular to a direction of the injection, and a width of the shape of the injection opening is narrow at the portion closer to the ignition plug, and is wide at the portion closer to the surface of the side wall.

3. The in-cylinder fuel injection internal-combustion engine according to claim 1, wherein a width of the shape is narrow at the portion closer to the ignition plug, and is wide at the portion closer to the surface of the side wall, and the injection opening has a shape that is substantially symmetrical with respect to a plane that includes a center axis of the fuel injection valve, and that is in substantially a wedge-shape that gradually narrows from an end on a cross-section perpendicular to a direction of the injection, and a width of the shape of the injection opening is narrow at the portion closer to the ignition plug, and is wide at the portion closer to the surface of the side wall.

4. The in-cylinder fuel injection internal-combustion engine according to claim 2, wherein the fuel injection valve further includes an opening that is a slit, and that is formed at the tip of the fuel injection valve at a portion along a plane that includes a substantially center axis of the fuel injection valve, the portion in a space inside the shape of the injection opening.

5. The in-cylinder fuel injection internal-combustion engine according to claim 4, wherein a length of the slit is substantially same as a length of one side of the injection opening.

6. The in-cylinder fuel injection internal-combustion engine according to claim 4, wherein a length of the slit is shorter than a length of one side of the injection opening.

7. The in-cylinder fuel injection internal-combustion engine according to claim 2, wherein the fuel injection valve further includes an opening that is substantially circular, and that is formed at the tip of the fuel injection valve at a portion on a plane that includes a substantially center axis of the fuel injection valve, the portion in a space inside the injection opening.

8. The in-cylinder fuel injection internal-combustion engine according to claim 2, wherein the fuel injection valve further includes an opening that is substantially elliptic, and that is formed at the tip of the fuel injection valve at a portion on a plane that includes a substantially center axis of the fuel injection valve, the portion in a space inside the injection opening.

9. The in-cylinder fuel injection internal-combustion engine according to claim 2, wherein the fuel injection valve further includes an opening that has a shape of a four sided figure, and that is formed at the tip of the fuel injection valve at a portion on a plane that includes a substantially center axis of the fuel injection valve, the portion in a space inside the injection opening.

10. The in-cylinder fuel injection internal-combustion engine according to claim 2, wherein the fuel injection valve further includes an opening that is triangular, and that is formed at the tip of the fuel injection valve at a portion on a plane that includes a substantially center axis of the fuel injection valve, the portion in a space inside the injection opening.

11. The in-cylinder fuel injection internal-combustion engine according to claim 7, wherein the opening is positioned at a narrower portion in the space inside the injection opening.

* * * * *

UNITED STATES PATENT AND TRADEMARK OFFICE
CERTIFICATE OF CORRECTION

| | |
|---|---|
| PATENT NO. | : 7,021,280 B2 |
| APPLICATION NO. | : 11/023358 |
| DATED | : April 4, 2006 |
| INVENTOR(S) | : Hiroshi Nomura |

It is certified that error appears in the above-identified patent and that said Letters Patent is hereby corrected as shown below:

"Please amend the title page as follows:
Item (73) Assignee:, please change "Toyota Jidoshi Kabushiki Kaisha" to
--Toyota Jidosha Kabushiki Kaisha--."

Signed and Sealed this

First Day of August, 2006

JON W. DUDAS
*Director of the United States Patent and Trademark Office*